J. BILAN.
STOVE.
APPLICATION FILED AUG. 14, 1919.

1,340,367.

Patented May 18, 1920.

Inventor
J. Bilan

By H. M. Wilson.
Attorney

UNITED STATES PATENT OFFICE.

JOHN BILAN, OF FLINT, MICHIGAN.

STOVE.

1,340,367.

Specification of Letters Patent.

Patented May 18, 1920.

Application filed August 14, 1919. Serial No. 317,517.

*To all whom it may concern:*

Be it known that I, JOHN BILAN, a citizen of Ukraine, residing at Flint, in the county of Genesee and State of Michigan, have invented certain new and useful Improvements in Stoves, of which the following is a specification.

The primary object of the invention is the provision of a stove especially adapted as a fluid fuel burner for heating and cooking purposes having suitable regulating means whereby the temperature of an oven portion thereof may be changed at will.

A still further object of the invention is the provision of a stove adapted for receiving articles to be heated or cooked having simple controlling means as well as a burner member, the entire structure being compact and ornamental in appearance and readily portable when desired.

With these general objects in view, the invention consists of the combination of parts hereinafter fully described in connection with the accompanying drawings and in which like reference characters will be found upon corresponding parts.

Figure 1:
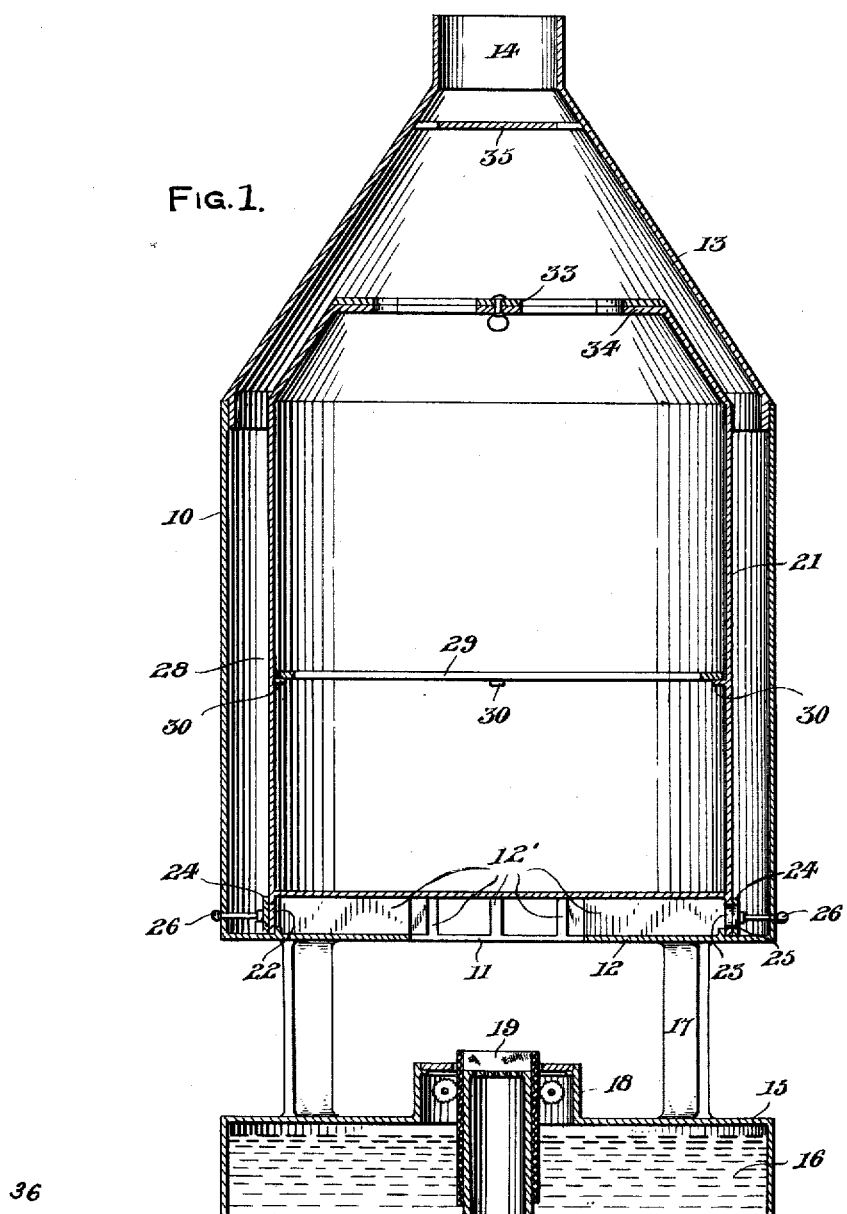
Figure 1 is a vertical diagrammatic sectional view of the stove.

Referring more in detail to the drawings, my stove comprises a cylindrical casing 10 with a central opening 11 in the bottom 12 thereof and a conical dome or top 13 having an outlet flue 14. A receptacle 15 adapted to receive fluid fuel 16 forms the base of the stove, suitable legs 17 upon the base 15 being mounted beneath the bottom 12 of the casing 10.

A burner 18 centrally of the receptacle 15 has a tubular wick 19 readily adjustable by a turn member, whereby the wick is lowered and elevated in the fuel 16 in substantially the usual manner directly beneath the casing opening 11. An inner casing or oven 21 substantially conforming to the shape of the casing 10 and of lesser dimensions than the casing 10 is mounted in the latter having an annular depending flange 22 upon the bottom of the oven 21 resting upon the bottom 12 of the casing 10, while openings 23 in the flange 22 permit the heat entering the opening 11 to pass into the heating chamber or space 28 between the casing 10 and the oven 21.

Arcuate dampers 24 are slidably mounted upon the bottom 12 adjacent the flange 22 having perforations 25 adapted to aline with the perforations 23 for adjustment of the damper by means of a handle 26 projecting exteriorly of the casing 10 through a suitable slot. One of said dampers is provided at each side of the stove for controlling heat perforations 23. A grid 29 is mounted upon lugs 30 in the oven 21 readily accessible by means of a hinged door in the front side of the casing 10.

Figure 2:
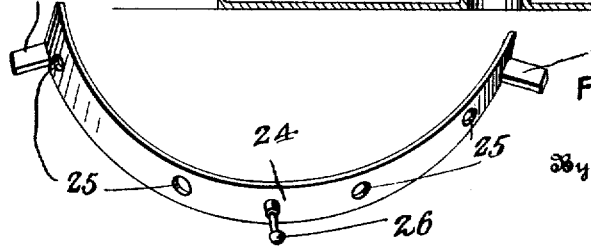
Fig. 2 is a perspective view of one of the dampers employed.

A damper 33 is also provided in the top 34 of the oven 21 beneath the outlet flue 14 while a baffle plate 35 is positioned in the dome 13 beneath the said flue. Spacing feet 36 upon the dampers 24 rest upon the casing bottom 12 as illustrated in Fig. 2 of the drawings, the dampers 24 being in close contact with the flange 22 and readily shifted by the handle 26 to open and close the perforations 23 for permitting the products of combustion to pass through the chamber 28 or for trapping the same in the space between the casing bottom 12 and the bottom of the oven 21. The wick 19 being lighted, the heat ascends through the opening 11 and being readily controlled in the manner heretofore set forth, the oven 21 is heated to the desired degree and articles may be placed upon the grid 29 while the regulation of the damper 33 within the oven 21 further assists in regulating the heat within the oven.

What I claim as new is:—

A stove comprising a fuel burner, vertical legs carried by said burner, a casing mounted on the upper ends of said legs above the said burner, an oven within said casing and equally spaced from the walls of the casing, a depending annular flange upon said oven resting upon the casing and having heat passage openings therein, an arcuate damper slidably associated with said flange, contacting the same throughout its length and having openings therein adapted to register with the flange openings, outwardly directed spacing feet carried by the damper and resting upon the casing bottom and contacting the inner wall of the casing to hold the damper in engagement with the oven flange and an operating handle for the damper carried thereby and projecting outwardly of the casing.

In testimony whereof I affix my signature.

JOHN BILAN.